United States Patent
Cuthrell et al.

(10) Patent No.: US 9,684,539 B1
(45) Date of Patent: Jun. 20, 2017

(54) METHODS, SYSTEMS, AND COMPUTER READABLE MEDIUMS FOR LOGICALLY REMEDIATING INFRASTRUCTURE RESOURCE COMPONENTS

(71) Applicant: VCE Company, LLC, Richardson, TX (US)

(72) Inventors: William Jason Cuthrell, Las Vegas, NV (US); Thaddeus W. Stoner, Clearwater, FL (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 0 days.

(21) Appl. No.: 14/573,544

(22) Filed: Dec. 17, 2014

(51) Int. Cl.
G06F 9/45 (2006.01)
G06F 9/50 (2006.01)

(52) U.S. Cl.
CPC .................. G06F 9/5011 (2013.01)

(58) Field of Classification Search
CPC ......... G06F 9/52; G06F 9/5016; G06F 9/5077
USPC ........................................ 718/104
See application file for complete search history.

(56) References Cited

U.S. PATENT DOCUMENTS

| | | | | |
|---|---|---|---|---|
| 6,519,571 | B1* | 2/2003 | Guheen | G06Q 30/02 705/14.66 |
| 8,706,914 | B2* | 4/2014 | Duchesneau | G06F 9/5072 709/203 |
| 8,856,077 | B1* | 10/2014 | Roth | H04L 67/1095 707/638 |
| 9,389,991 | B1* | 7/2016 | Molner | G06F 8/60 |
| 2005/0132350 | A1* | 6/2005 | Markley | G06F 8/65 717/168 |
| 2008/0285481 | A1* | 11/2008 | Hao | H04L 41/5003 370/254 |
| 2008/0301025 | A1* | 12/2008 | Boss | G06Q 10/06 705/37 |
| 2010/0115081 | A1* | 5/2010 | Janakiraman | G06F 11/008 709/223 |
| 2010/0153157 | A1* | 6/2010 | Wade | G06Q 10/0631 705/7.12 |
| 2015/0082016 | A1* | 3/2015 | Bonczkowski | G06F 8/61 713/100 |
| 2016/0098340 | A1* | 4/2016 | Weaver | G06F 21/55 714/38.1 |

* cited by examiner

*Primary Examiner* — John Chavis
(74) *Attorney, Agent, or Firm* — Jenkins, Wilson, Taylor & Hunt, P.A.

(57) ABSTRACT

Methods, systems, and computer readable mediums for logically remediating infrastructure resource components are disclosed. According to one example, the method includes interfacing an infrastructure component remediation (ICR) device to a plurality of infrastructure resource components located at a data facility area in order to assess a configuration state for each of the plurality of infrastructure resource components. The method further includes identifying, via the interfaced ICR device, a disparity existing between a converged infrastructure baseline configuration and the assessed configuration states associated with the infrastructure resource components, and remediating, via the interfaced ICR device, the plurality of infrastructure resource components to logically operate as a converged infrastructure that complies with the converged infrastructure baseline configuration.

20 Claims, 4 Drawing Sheets

METHODS, SYSTEMS, AND COMPUTER READABLE MEDIUMS FOR LOGICALLY REMEDIATING INFRASTRUCTURE RESOURCE COMPONENTS

TECHNICAL FIELD

The subject matter described herein relates to a mobile remediation solution configured to update non-compliant infrastructure resources. More specifically, the subject matter relates to methods, systems, and computer readable mediums for logically remediating infrastructure resource components.

BACKGROUND

At present, data facility areas (e.g., a data center warehouse facility) typically host and support a number of compute resources, storage resources, and network resources. Frequently, the resource components found in a data facility area constitute silo resources, which comprise individual resource components that operate independent from other silo resources. Notably, a given silo resource does not have a sense of awareness or able to cooperate with other silo resources in the data facility area. This architecture configuration is largely distinguished from a converged infrastructure (CI) system, which may afford a user combined utilization of the included compute, storage, network, and virtualization resources within a single system as opposed to individual silo resources. Regardless of the architecture configuration (e.g., a collection of silo resources or a CI system), the updating or remediating of the associated resource components to achieve a quantified baseline can be a challenge in instances where the candidate collection of infrastructure resides at data facility area location.

SUMMARY

Methods, systems, and computer readable mediums for logically remediating infrastructure resource components are disclosed. According to some embodiment, the method includes interfacing an infrastructure component remediation (ICR) device to a plurality of infrastructure resource components located at a data facility area in order to assess a configuration state for each of the plurality of infrastructure resource components. The method further includes identifying, via the interfaced ICR device, a disparity existing between a converged infrastructure baseline configuration and the assessed configuration states associated with the infrastructure resource components, and remediating, via the interfaced ICR device, the plurality of infrastructure resource components to logically operate as a converged infrastructure that complies with the converged infrastructure baseline configuration.

BRIEF DESCRIPTION OF THE DRAWINGS

The subject matter described herein will now be explained with reference to the accompanying drawings of which.

DETAILED DESCRIPTION

Figure 1:
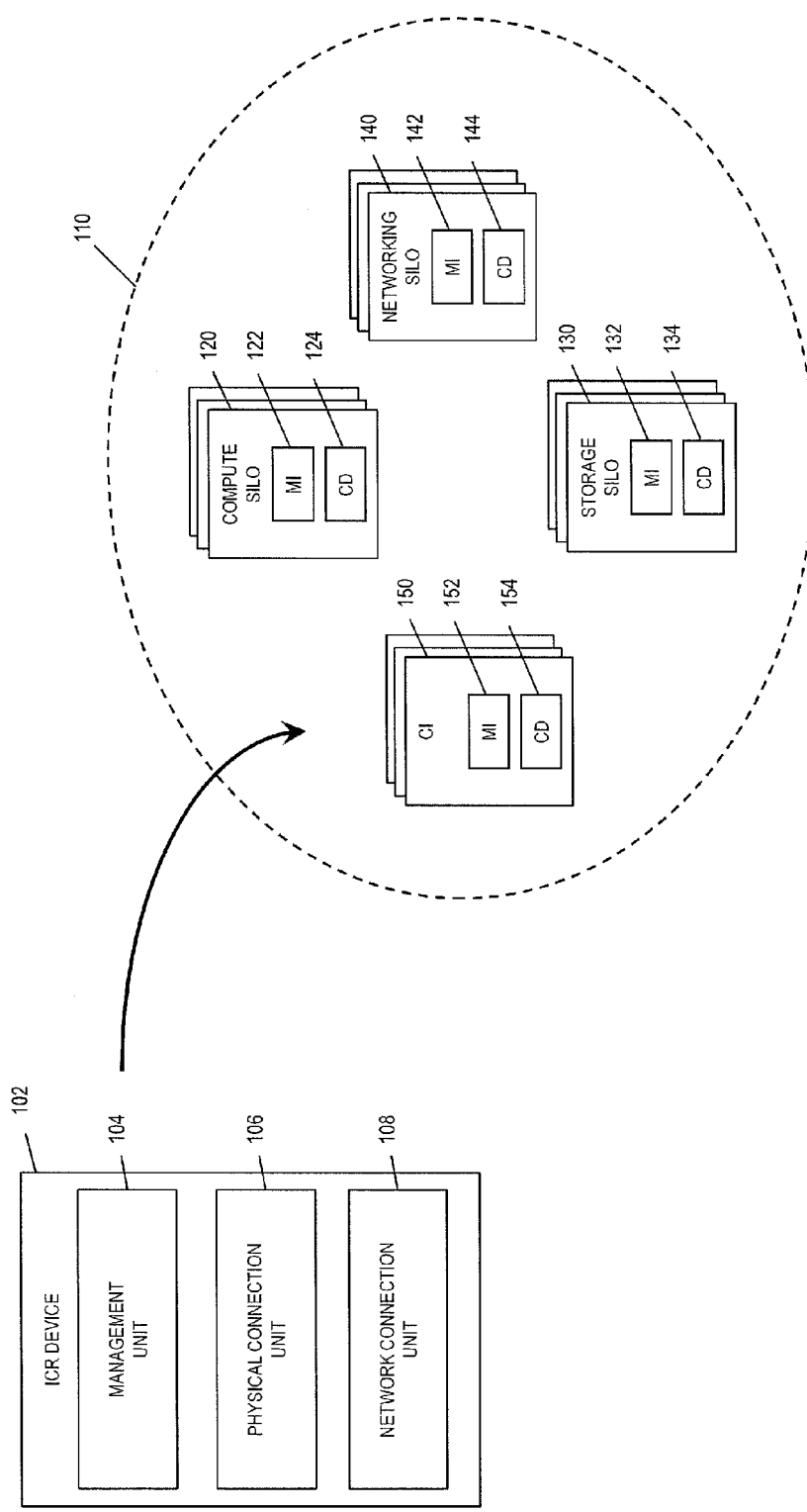
FIG. 1 illustrates an exemplary system for remediating infrastructure resource components in accordance with embodiments of the subject matter described herein.

The subject matter described herein discloses methods, systems, and computer readable mediums for logically remediating infrastructure resource components. In some embodiments, the disclosed subject matter includes an infrastructure component remediation (ICR) device or system that comprises one or more self-contained, ruggedized case(s). In particular, the ICR device case is capable of being shipped or deployed (e.g., using common air and ground carrier logistic services) for delivery to a customer data center facility. The ICR device may also contain a bastion host that contains all physical interface connections (and cabling), mobile broadband transceivers, virtual private networking capabilities, and the management software that can be used to remediate a candidate collection of infrastructure components (e.g., individual silo resources or a non-compliant converged infrastructure system). In some embodiments, the ICR device is delivered to the customer data center facility in the self-contained case(s) and is physically connected to the infrastructure resource components. The ICR device may then obtain configuration and capability data from the infrastructure components in order to logically assess their collective CI candidacy. Utilizing data acquired from the component assessment, ICR device may update and/or remediate the infrastructure resource components in accordance to a CI configuration (e.g., an RCM configuration) that has been identified as suitable for the assessed components.

As indicated above, the disclosed subject matter can be utilized within an infrastructure system that is distributed among a plurality of disparate and distributed segment components, such as silo resources and reference architectures. Alternatively, the resource components may be contained within a single converged infrastructure (CI) system. As used herein, a CI system, such as a Vblock™ System from VCE Company, LLC, can comprise multiple converged infrastructure components in a preconfigured or prepackaged computing platform. For example, a CI system can include a single computing platform unit associated with racks of physical CI components and related software for performing virtualization and/or other information technology (IT) functions. In some embodiments, each of the CI components associated with a CI system can comprise one of a compute component, a networking component, a data storage component, other hardware components, and software components. For example, a CI system can comprise data storage devices, compute devices (e.g., a unified computing system device), networking equipment (e.g., switch devices), and software for managing physical resources and/or virtualized resources (e.g., virtual servers). In some embodiments, both the distributed infrastructure system and CI system architecture may be connected and jointly accessible by the ICR device without departing from the scope of the disclosed subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary system 100 that includes an ICR device 102 and a data facility area 110. As indicated above, ICR device 102 comprises one or more self-contained, ruggedized cases capable of being deployed for delivery to a customer data center, such as data facility area 110. Notably, FIG. 1 illustrates the transport of ICR device 102 to data facility area 102 for the purpose of logically assessing whether the resident resource components (e.g., compute silo resource components 120, data store silo resource components, 130, and networking silo resource components 140) are suitable for constructing a logically compliant CI system.

In some embodiments, data facility area 110 may comprise any customer data location (e.g., a data warehouse facility, a data server room, etc.) that includes a plurality of infrastructure resource components, such as compute silo resource components 120, data store silo resource components 130, and/or networking silo resource components 140. Similarly, data facility area 110 may include one or more non-compliant CI system(s) 150. As described above, a "silo" may refer to a resource component that typically operated and utilized by a network system in an independent manner with respect to other resource components. In some instances, silos resource components may not even be communicatively connected with other silo resource components. Regardless of whether data facility area 110 includes silo resource components or non-compliant CI systems, network administrators frequently discover that the configuration state associated with silo components and/or CI systems located within a data facility area may deviate from a logically compliant or quantified CI baseline configuration. In such scenarios, a network administrator may request for an ICR device (e.g., ICR device 102) to be delivered to the customer data center location (e.g., data facility area 110). As indicated in FIG. 1, each of compute silo resource components 120, data store silo resource components 130, and/or networking silo resource components 140 and/or CI system 150 includes configuration data that may comprise a collection of state parameters that are indicative of the configuration state of said respective resource component. For example, compute silo resource component 120 includes configuration data 124, data store silo resource component 130 includes configuration data 134, and networking silo resource component 140 includes configuration data 144. Similarly, CI 150 includes configuration data 154. Notably, the configuration data may comprise any state information or parameter data that is indicative the resource component's compliance with (or deviation from) a quantified baseline (e.g., a CI baseline configuration). In some embodiments, ICR device 102 is configured to establish a connection with and assess the individual infrastructure resource components (individually or simultaneously) to obtain configuration data 124, 134, 144, and/or 154. Exemplary configuration data include state parameters representing i) compliance values/identifiers indicative of a CI baseline configuration (e.g., an RCM level) and/or ii) measured capabilities and capacities associated with the execution and support of workload applications (e.g., virtualized workloads and/or bare metal workloads). For example, state parameters and configuration data may include, but are not limited to, i) firmware versions and levels per resource component, ii) running operating environments for compute silo assemblies, iii) running operating environments for storage silo assemblies and/or resource components, iv) physical and virtual port counts along with performance statistics per resource component and in aggregate, iv) power and cooling parameters (e.g., fan speeds) and nominal draw per resource component and in aggregate, v) RS232/RS422/RS485 serial data output per resource component, vi) USB data output per resource component, vii) out of band and/or Ethernet management interface output per resource component, and/or viii) running logical configurations for compute, storage, network, and related appliances performing one or more of these functions per resource component. In some embodiments, the configuration data may include any information or metrics that is representative of the current state of the resource component in terms of physical, logical, and environmental customization parameters.

As indicated above, ICR device 102 may be shipped to data facility area 110 for the purpose of logically assessing whether the resident resource components, such as compute silo resource components 120, data store silo resource components 130, and/or networking silo resource components 140 are suitable for logically constructing a remediated CI system. As shown in FIG. 1, ICR device 102 may include a management unit 104, a physical connection unit 106, and a network connection unit 108. In some embodiments, management unit 104 includes an initialization system host that includes management software and automation software required to assess and remediate a silo resource components into a logically compliant CI system. Management unit 104 may include a physical management console, such as a keyboard or touchscreen that may serve as a user interface for an administrator. Similarly, physical connection unit 106 may include a number of physical interfaces and connections (e.g., networking cables, wires, etc.) that are used to establish a communications connection with compute silo resource components 120, data store silo resource components 130, networking silo resource components 140, and/or CI 150. Notably, physical connection unit 106 may include a plurality of physical cable or wire connections, at least one of which may be used to facilitate a physical connection to a resource component via a resident management interface (e.g., a physical port). For example, FIG. 1 illustrates compute silo resource component 120 including a management interface 122, data store silo resource component 130 including a management interface 132, and networking silo resource component 140 including a management interface 142. Additional description regarding the connection between management interfaces 122, 132, and 142 with physical connection unit 106 is provided below with respect to FIG. 2. Similarly, ICR device 102 includes a network connection unit 108 that is configured to establish a mobile broadband connection, virtual private networking (VPN) connection, or any other connectivity to a carrier. Additional detail is similarly provided in the description below with respect to FIG. 2.

In some embodiments, each of units 104-108 comprises its own self-contained, ruggedized case that is capable of being deployed (e.g., using common air and ground carrier logistic services) for delivery to a customer data center, such as data center location 102, that includes the candidate collection of infrastructure resource components. For example, upon arriving at location 102, each of the units 104-108 is opened and subsequently initialized, cross-connected, networked, and securely connected to a communications network (e.g., a VPN via Internet egress, a secure mobile broadband egress, etc.). Afterwards, the physical connections of the ICR device 102 are joined to the management interfaces for the compute, storage, and network resource components of the customer's infrastructure.

It will be appreciated that FIG. 1 illustrates an exemplary embodiment and that various nodes, their locations, and/or their functions as described above in relation to FIG. 1 may be changed, altered, added, or removed.

Figure 2:
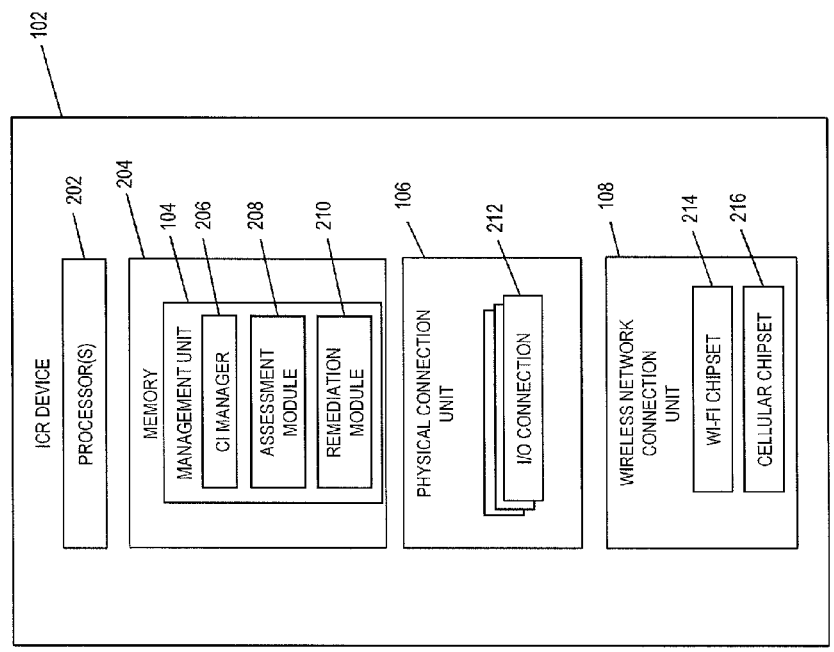
FIG. 2 illustrates an exemplary device for remediating infrastructure resource components in accordance with embodiments of the subject matter described herein.

FIG. 2 illustrates an exemplary infrastructure component remediation (ICR) device in accordance with embodiments of the subject matter described herein. In some embodiments, ICR device 102 includes at least one processor unit 202 and memory 204. In some embodiments, ICR device 102 may include or utilize at least one processor 202 and at least one memory module 204 to operate each of management unit 104, physical connection unit 106, wireless network connection unit 108 and other various resources via a system bus (not shown). In some embodiments, processor unit(s) 202 can include a microprocessor, a central processing unit (CPU), or any other like hardware based processor unit (e.g., a compute component). Similarly, memory module 204 may include random access memory (RAM), read only memory (ROM), optical read/write memory, cache memory, magnetic read/write memory, flash memory, or any other non-transitory computer readable medium.

As shown in FIG. 2, ICR device 102 includes physical connection unit 106, which includes a plurality of input/output (I/O) connections 212. Exemplary I/O connections 212 comprise networking cabling and ports associated with one or more USB connections, one or more RS-232/RS422/RS485 connections, one or more Ethernet connections, one or more various IETF-Draft connections, as well as connections including, but not limited to, Craft interfaces used in command line interfaces, cursor based interfaces, and/or or richer graphical experiences, and the like. Notably, physical connection unit 106 provides an ability to physically connect ICR device 102 with silo resource components and/or non-compliant CI systems. In some embodiments, physical connection unit 106 provides one or more physical out of band connections that are necessary to initiate communication with a respective one or more resource components. For example, a sufficient number of 10/100/1000 Ethernet ports may be reserved and supplied to make connections to out of band Ethernet management interfaces for all candidate silos that are compute, storage, and network components. In instances where the use of an out of band Ethernet connection is unfavorable and serial connectivity is favorable, that consideration is also supplied to mitigate such scenarios. Beyond these connections to the candidate silos, there is additional wired connectivity optionality to leverage existing IP local area network (LAN) egress to IP wide area network (WAN) and/or Internet egress connectivity for establishing a secure VPN from the ICR device to a trusted third party, either on site or at another remote physical location.

As indicated above, ICR device 102 may include network connection unit 108. In some embodiments, network connection unit 108 includes a Wi-Fi chipset 214 that enables ICR device 102 to establish a wireless Internet connection should LAN or other wired connectivity options be unavailable for any reason or as a means of redundancy in the event of instability in wired connectivity options. Moreover, connection unit 108 further includes a mobile broadband chipset 216 that enables ICR device 102 to establish a mobile broadband connection with a cellular access network to address LAN and WLAN connectivity unavailability or instability. Since there are no assumptions regarding the network connectivity options available at the location ICR device 102 is shipped (e.g., data facility area 110), network connection unit 108 affords ICR device 102 with a number of options to achieve remote connectivity. For example, network connection unit 108 may be configured to autonomously establish (while located at the data facility area) one or more wireless connections to a carrier or service provider to facilitate the downloading of remediation software (e.g., software corresponding to designated CI baseline configuration) or uploading of data associated with backup procedures. This process is meant to establish a trusted secure connectivity path to a trusted third party for both the collection, sequestration, and analysis of state parameters and configuration data in addition to providing a connection for both read and write paths for the purpose of remediation.

Similarly, management unit 104 in ICR device 102 includes a CI manager module 206, an assessment module 208, and a remediation module 210. In some embodiments, CI manager 206 which may include any suitable software entity that manages the operation and remediation functions performed by ICR device 102. For example, CI manager 202 may be configured to acquire and organize configuration data, such as performance, health, and utilization data associated with silo resource components. For example, after establishing a physical connection with one or more resource components, CI manager 206 may be configured to query said resource components for configuration data. In some embodiments, CI manager 206 comprises VCE Vision™ Intelligent Operations software and/or firmware that may be executed by processor 202 or any other processor unit present in ICR device 102 (e.g., an advanced management pod (AMP)).

In some embodiments, CI manager 202 may also oversee and manage assessment module 208 and remediation module 210 shown in FIG. 2. In some embodiments, assessment module 208 can be utilized to process configuration data obtained by CI manager 206 from physically interfaced silo resource components found in data facility area 110. For example, assessment module 208 may be configured to utilize a physical out of band connection established by physical connection unit 108 and interrogate the operating systems of associated with each of silo resource components 120, 130, and 140 via management interfaces 122, 132, and 142, respectively for configuration data (e.g., RCM data, capability and capacity data, state parameters, etc.) This may include, but is not limited to, operating environments of resource components and appliances, operating systems, operating system service packs, jumbo software patches, discreet software patches, and specific application packages that complement or facilitate remediation activities and establish a baseline of interoperability consistent with a CI system. Likewise, assessment module 208 may be configured to receive configuration data from an interfaced non-compliant CI 150 in data facility area 110. In some embodiments, the configuration data includes compliance metric data that may be obtained by CI manager 206 and forwarded to assessment module 208 for processing. In some embodiments, assessment module 208 may be configured to analyze the configuration data and determine the performance capability and capacity information associated with a plurality of interrogated silo resource components in a simultaneous manner. Similarly, assessment module 208 may be configured to determine whether the interrogated silo resource components (as a collective group) are compliant (or, alternatively, capable of being compliant) with respect to a particular designated CI configuration (e.g., an RCM level). For example, assessment module 208 may be adapted to compare configuration identifiers associated with each of the silo resource components (e.g., the revision/version number of the associated CI component hardware, firmware, BIOS, software, drivers, etc.) and compare this information with various established quantified baseline configurations (e.g., CI configuration versions). Notably, assessment module 208 may be adapted to identify a disparity (or difference, gap, etc.) existing between each of the CI baseline configurations and the assessed configuration states associated with the infrastructure resource components. In some embodiments, arrival at a quorum of state parameters and configuration data involves the combination and correlation of compute, storage, and network capabilities and ratios that take into account oversubscription ratios for the service-level agreement (SLA) at a physical planning level through to an interoperability and citizenship amongst operating environments per resource component. These considerations are primarily, but not limited to, throughput calculations and a balance between compute and storage resources along network connections for both storage and network protocol traffic paths in addition to northbound connectivity from compute components to LAN resources as well as network protocol connectivity from storage components. Further, logical mapping of virtualized and non-virtualized workloads residing within the compute components and potentially corresponding storage component allocations and assignments are considered.

After assessment module 208 analyzes the configuration data associated with each and all of the candidate silo resource components, remediation module 210 initiates a remediation and/or update procedure. Notably, management unit 104 includes a remediation module 210 that is adapted for conducting updates and remediating silo resource components (e.g., components 120, 130, and 140) or non-compliant CI systems. In some embodiments, remediation module 210 may comprise an update framework module or any suitable entity (e.g., software executing on a processor) for facilitating the remediation (e.g., a CI configuration update) for an infrastructure system. For example, remediation module 210 may be configured to receive CI configuration compliance information from assessment module 208, instruct CI manager 206 to conduct authorization and authentication processes, and identify/obtain remediation software content data from a local data store (not shown) and/or an offsite repository (e.g., via physical connection unit 108).

In some embodiments, remediation module 210 may also be configured to determine (e.g., identify and/or locate) the remediation software content needed to update and compel each of the silo resource components to become compliant with the defined CI configuration baseline (e.g., quantified baseline). For example, remediation module 210 may determine whether the remediation software content (e.g., update software of the requisite revision number) for each of the identified non-compliant silo resource components is stored in one or more locations on ICR device 102 or in an offsite repository (e.g., an online location). If the remediation software content is not stored in ICR device 102, remediation module 210 may send a query message to the offsite repository via connection unit 106 or 108 to request the delivery of the remediation software content to the non-compliant resource components. Alternatively, remediation module 210 may issue a request for location information (e.g., an IP address, database address, etc.) indicating one or more network locations of the identified remediation software content. Once the remediation software content is delivered to the resource components, remediation module 210 may be configured to provision one or more of the resource components with a CI manager software package module (e.g., software not unlike CI manager 206). Notably, once the remediation software content and the CI management software application is delivered and installed, the silo resource components will both logically resemble and function as a CI system.

Figure 3:
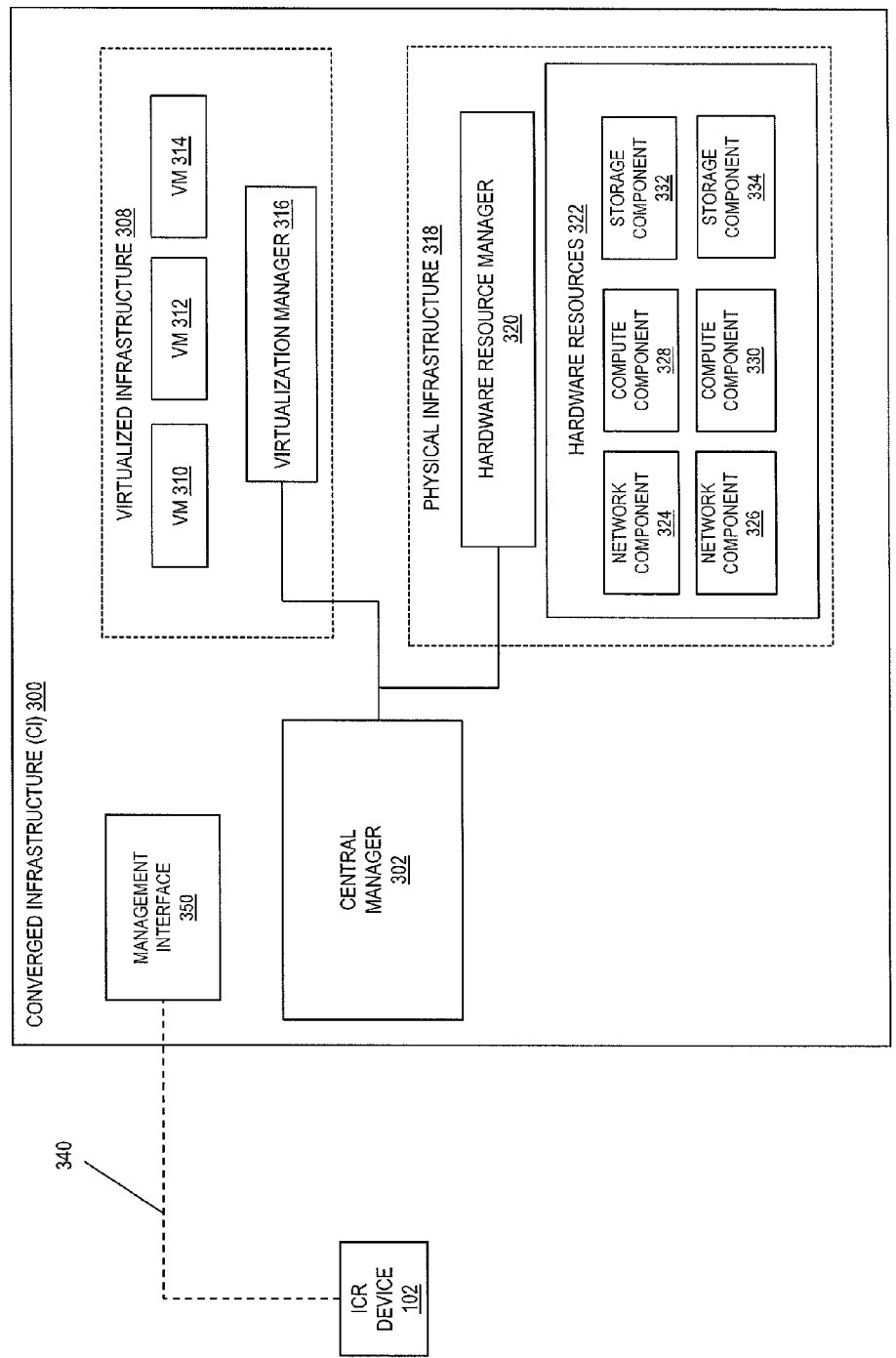
FIG. 3 illustrates an exemplary converged infrastructure in accordance with embodiments of the subject matter described herein.

As indicated above, the disclosed subject matter can also be utilized in a converged infrastructure (CI) system. FIG. 3 is a diagram illustrating exemplary CI system 300 according to an embodiment of the subject matter described herein. In some embodiments, CI system 300 can include one or more physical resources and one or more virtual resources. Exemplary physical resources can comprise a processor, a compute device, network equipment, a router, a switch, wiring or cabling, a storage device, a physical port, and/or a communications interface. Exemplary virtual resources can comprise a virtual entity (e.g., an entity that appears as a physical entity but comprises one or more CI components associated with one or more CI systems), a virtual machine, a virtual server, a virtual storage device, a virtual port, and/or a virtual communications interface. CI system 300 may also comprise software and related CI components for managing the CI system and/or portions therein.

In some embodiments, CI system 300 can be configured to provide data center functionality, cloud service functionality, and/or other IT functionality which can support a vast number of software workloads. CI system 300 can also be configured to communicate with ICR device 102 as well as various other entities, such as other CI systems and silo resource components. For example, ICR device 102 may use a physical cable connection 340 from physical connection unit 106 (shown in FIG. 2) to access and interrogate a central manager 302 via a direct connection to management interface 350.

In some embodiments, central manager 302 (e.g., a CI system management module) may be configured to manage the operation of CI system 300 and may be configured to communicate with various CI components, such as virtual resources, physical resources, and/or software for managing the CI components. For example, central manager 302 may be configured to manage performance, resource utilization levels, and other aspects associated with virtualized infrastructure 308 and/or physical infrastructure 318. In some embodiments, central manager 302 comprises VCE Vision™ Intelligent Operations software and/or firmware.

In some embodiments, central manager 302 may be utilized to manage infrastructure elements (e.g., CI resource components) that are utilized to execute and support application workloads. For example, central manager 302 can be configured to communicate with a virtualization manager 316 and a hardware resource manager 320 to obtain configuration data associated with the resource components located in both the virtualized infrastructure 308 and the physical infrastructure 318 of CI system 300.

In some embodiments, virtualized infrastructure 208 can comprise a virtualization environment configured to simulate components of a computing device, e.g., a processor, system memory, and a storage device, for executing one or more virtual machines (VMs). For example, each of VM 310, VM 312, and VM 314 may be configured to perform various functions and/or services, such as web server functions, cloud application services, and other application workloads. In some embodiments, virtualized infrastructure 308 may be associated with one or more virtual entities. In some embodiments, virtualization manager 316 may be any suitable entity (e.g., software executing in a virtual machine) for managing aspects associated with virtualized infrastructure 308. Notably, virtualization manager 316 may be configured to provide configuration data associated with the virtual machines hosted by CI 300 to ICR device 102 via central manager 302. Further, the combination of both virtual and non-virtual environments is considered such that the CI system may operate in either paradigm or in some combination or ratio that proves to be most beneficial for the associated workloads used against a target CI environment.

Likewise, physical infrastructure 318 can comprise hardware resources 322, such as network components 324-326, compute components 328-330 (sometimes referred to as "hosts", compute devices, and/or compute servers), and a storage area network (SAN) comprising storage components 332-334 that are managed by a hardware resource manager 320. Hardware resources 322 may be communicatively connected to various other resource components in CI system 300 and other entities. In some embodiments, network components 324-326 (e.g., network switches) may be configured to enable communication between the resources within the CI system. For example, compute component 328 and storage component 332 may be used in implementing VM 210 and VM 212 and compute component 330 and storage component 334 may be used in implementing VM 214 and virtualization manager 216.

Hardware resource manager 320 may include any suitable entity for managing aspects associated with physical infrastructure 318. In some embodiments, hardware resource manager 320 may be configured to monitor and manage hardware resources 322 via one or more communication interfaces. For example, hardware resource manager 320 may direct hardware resources 322 to implement one or more virtual entities in virtualized infrastructure 308. Hardware resource manager 320 may also be configured to monitor and record configuration data associated with hardware resources 322. In some embodiments, hardware resource manager 320 is configured to forward the configuration data to central manager 302 on a periodic basis and/or upon request (by central manager 302).

Upon acquiring the necessary configuration data from hardware resource manager 320 and/or virtualization manager 316, central manager 302 may forward the collective configuration data associated with components 324-334 and virtual machines 310-314 to ICR device 102 via management interface 350. At this stage, ICR device 102 processes the configuration data and remediates the components of CI 300 in the manner described above. It will be appreciated that FIG. 3 illustrates an exemplary embodiment and that various nodes, their locations, and/or their functions as described above in relation to FIG. 3 may be changed, altered, added, or removed.

Figure 4:
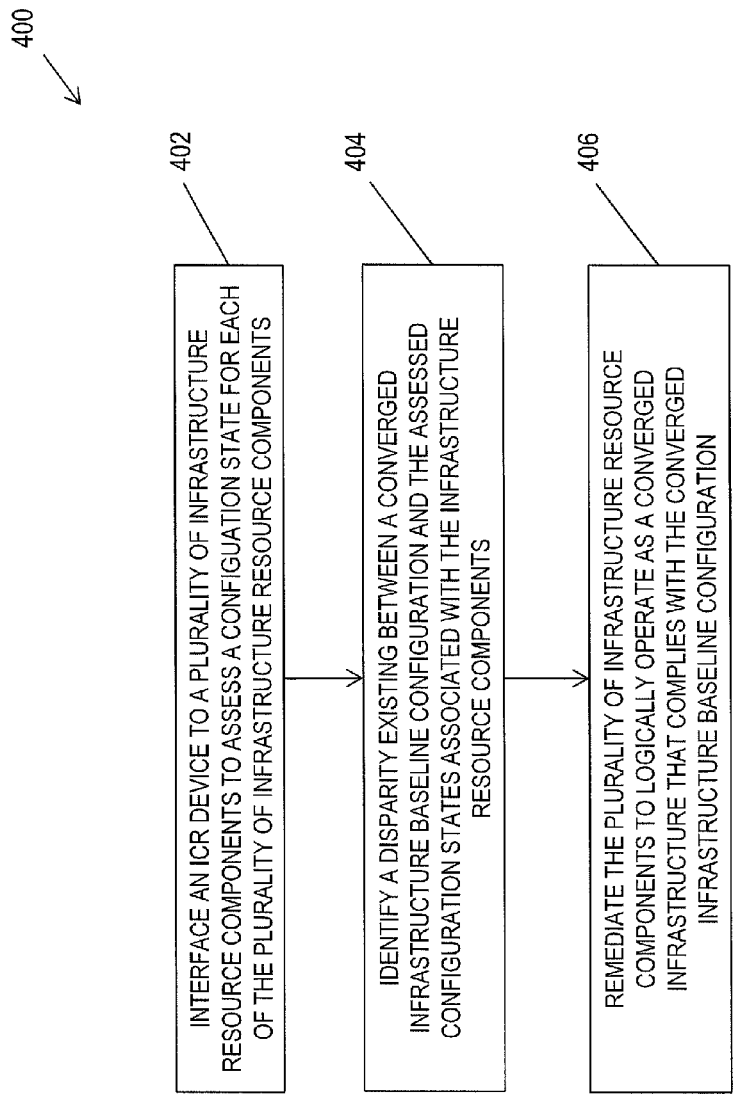
FIG. 4 illustrates a flow chart of an exemplary process for logically remediating infrastructure resource components in accordance with embodiments of the subject matter described herein.

FIG. 4 illustrates a flow chart of an exemplary process 400 for logically remediating infrastructure resource components in accordance with embodiments of the subject matter described herein. At step 402, an ICR device is interfaced to a plurality of infrastructure resource components located at a data facility area in order to assess a configuration state for each of the plurality of infrastructure resource components. In some examples, an ICR device may be shipped or transported to a data facility area in which a collection of infrastructure resource components has been identified and designated for remediation. After arriving at the data facility area, the ICR device may be physically cross-connected and networked with the infrastructure resource components. Similarly, the ICR device may be configured to establish a wireless communications with either secure mobile broadband network and/or a VPN via an Internet connection.

At step 404, a disparity existing between a CI baseline configuration and the assessed configuration states associated with the infrastructure resource components is identified. In some embodiments, the ICR device is configured to obtain configuration data from each of the infrastructure resource components being assessed at the data facility area. Afterwards, the ICR device may process and/or compare the acquired configuration data from the infrastructure resource components with an established CI baseline configurations (e.g., one or more possible RCM levels or configurations) in order to identify a disparity or gap. In some embodiments, the ICR device may compare the acquired configuration data from the infrastructure resource components with a plurality of potential CI baseline configurations and respectively identify a disparity or gap for each considered CI baseline configuration.

At step 406, the infrastructure resource components are remediated to logically operate as a CI that complies with the CI baseline configuration. In some embodiments, the ICR device remediates each of the infrastructure resource components to achieve the established CI configuration baseline. For example, after determining a CI baseline configuration to be used, the ICR device may be configured to communicate with an off-site and/or on-line repository that stores software and firmware associated with the identified CI baseline configuration. After receiving the software associated with the identified CI baseline configuration (e.g., a designated RCM level), the ICR device may be configured to provision each of the infrastructure resource components with the identified software. After being provisioned with the software identified in the designated CI baseline configuration (and the CI management software application), the infrastructure resource components may collectively operate as a CI that complies with the baseline configuration. In some other embodiments, a CI manager software package module may be installed on one of the remediated compute components such that the collection of infrastructure resource components may operate as a logically compliant CI.

As indicated above, the subject matter described herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions which, when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. As used herein, the terms "function" or "module" refer to hardware, firmware, or software in combination with hardware and/or firmware for implementing features described herein.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for logically remediating infrastructure resource components, the method comprising:
   interfacing an infrastructure component remediation (ICR) device to a plurality of infrastructure resource components in order to assess a configuration state for each of the plurality of infrastructure resource components, wherein interfacing the ICR device includes establishing a physical connection between the ICR device and a physical port on at least one selected from a group consisting of at least one of the plurality of infrastructure resource components and a computing platform including the plurality of infrastructure resource components;
   identifying, via the interfaced ICR device, a disparity existing between a converged infrastructure baseline configuration and the assessed configuration states associated with the infrastructure resource components, wherein identifying the disparity includes comparing software version numbers associated with the infrastructure resource components to revision numbers indicated by the converged infrastructure base line configuration to identify the disparity; and
   remediating, via the interfaced ICR device, the plurality of infrastructure resource components to logically operate as a converged infrastructure that complies with the converged infrastructure baseline configuration;
   wherein the ICR device comprises a self-contained case that includes a wireless network connection unit configured to establish one or more wireless connections for facilitating a downloading of remediation software corresponding to the converged infrastructure baseline configuration.

2. The method of claim 1 wherein the plurality of infrastructure resource components comprises a plurality of silo resource components.

3. The method of claim 1 wherein the infrastructure resource components include converged infrastructure components located within a converged infrastructure system.

4. The method of claim 1 wherein interfacing the ICR device with one of the infrastructure resource components includes establishing a physical communication connection between the ICR device and each of the plurality of infrastructure resource components.

5. The method of claim 1 wherein remediating the plurality of infrastructure resource components includes provisioning a converged infrastructure management application on at least one of the plurality of infrastructure resource components.

6. The method of claim 1 wherein remediating the plurality of infrastructure resource components includes autonomously establishing network connectivity.

7. The method of claim 1 wherein the configuration state for each of the plurality of infrastructure resource components represents a collection of state parameters maintained at each of the plurality of infrastructure resource components.

8. An system for logically remediating infrastructure resource components, the system comprising:
   at least one processor;
   memory; and
   a management unit module utilizing the at least one processor and memory, wherein the management unit module is configured to:
      interface an infrastructure component remediation (ICR) device to a plurality of infrastructure resource components in order to assess a configuration state for each of the plurality of infrastructure resource components, wherein the ICR device and the plurality of infrastructure resource components are interfaced via a physical connection established between the ICR device and a physical port on at least one selected from a group consisting of at least one of the plurality of infrastructure resource components and a computing platform including the plurality of infrastructure resource components;
      identify, via the interfaced ICR device, a disparity existing between a converged infrastructure baseline configuration and the assessed configuration states associated with the infrastructure resource components by comparing software version numbers associated with the infrastructure resource components to revision numbers indicated by the converged infrastructure base line configuration; and
      remediate, via the interfaced ICR device, the plurality of infrastructure resource components to logically operate as a converged infrastructure complying with the converged infrastructure baseline configuration;
      wherein the ICR device comprises a self-contained case that includes a wireless network connection unit configured to establish one or more wireless connections for facilitating a downloading of remediation software corresponding to the converged infrastructure baseline configuration.

9. The system of claim 8 wherein the plurality of infrastructure resource components comprises a plurality of silo resource components.

10. The system of claim 8 wherein the infrastructure resource components include converged infrastructure components located within a converged infrastructure system.

11. The system of claim 8 wherein the ICR device includes a physical connection unit that establishes a physical communication connection between the ICR device and each of the plurality of infrastructure resource components.

12. The system of claim 8 wherein the management unit module is further configured to provision a converged infrastructure management application on at least one of the plurality of infrastructure resource components.

13. The system of claim 8 wherein the ICR device includes a network connection unit for autonomously establishing network connectivity.

14. The system of claim 8 wherein the configuration state for each of the plurality of infrastructure resource components represents a collection of state parameters maintained at each of the plurality of infrastructure resource components.

15. A non-transitory computer readable medium having stored thereon executable instructions which, when executed by a processor of a computer, cause the computer to perform steps comprising:
   interfacing an infrastructure component remediation (ICR) device to a plurality of infrastructure resource components in order to assess a configuration state for each of the plurality of infrastructure resource components, wherein interfacing the ICR device includes establishing a physical connection between the ICR device and a physical port on at least one selected from a group consisting of at least one of the plurality of infrastructure resource components and a computing platform including the plurality of infrastructure resource components;

identifying, via the interfaced ICR device, a disparity existing between a converged infrastructure baseline configuration and the assessed configuration states associated with the infrastructure resource components, wherein identifying the disparity includes comparing software version numbers associated with the infrastructure resource components to revision numbers indicated by the converged infrastructure base line configuration to identify the disparity; and remediating, via the interfaced ICR device, the plurality of infrastructure resource components to logically operate as a converged infrastructure that complies with the converged infrastructure baseline configuration;

wherein the ICR device comprises a self-contained case that includes a wireless network connection unit configured to establish one or more wireless connections for facilitating a downloading of remediation software corresponding to the converged infrastructure baseline configuration.

16. The computer readable medium of claim 15 wherein the plurality of infrastructure resource components comprises a plurality of silo resource components.

17. The computer readable medium of claim 15 wherein the infrastructure resource components include converged infrastructure components located within a converged infrastructure system.

18. The computer readable medium of claim 15 wherein interfacing the ICR device with one of the infrastructure resource components includes establishing a physical communication connection between the ICR device and each of the plurality of infrastructure resource components.

19. The computer readable medium of claim 15 wherein remediating the plurality of infrastructure resource components includes provisioning a converged infrastructure management application on at least one of the plurality of infrastructure resource components.

20. The computer readable medium of claim 15 wherein the configuration state for each of the plurality of infrastructure resource components represents a collection of state parameters maintained at each of the plurality of infrastructure resource components.

* * * * *